July 30, 1940.　　　　F. M. BECK　　　　2,209,805
CONTROL FOR RESISTANCE LINE WELDING MACHINES
Filed Dec. 31, 1938

Inventor:
Francis M. Beck,
by Harry E. Dunham
His Attorney.

Patented July 30, 1940

2,209,805

UNITED STATES PATENT OFFICE 2,209,805

CONTROL FOR RESISTANCE LINE WELDING MACHINES

Francis M. Beck, Schenectady, N. Y., assignor to General Electric Company, a corporation of New York Application December 31, 1938, Serial No. 248,761

6 Claims. (Cl. 219—4)

My invention relates to an improved control for resistance line welding machines in which an electrode is positioned relative to the work by the return movement of a travel carriage which, under the influence of its reversing control, does not uniformly come to the same position at the end of a return stroke following a work stroke.

It is an object of my invention to provide a control which gives the best possible weld location commensurate with the variations in return movement of the travel carriage.

It is a further object of my invention to provide a control in which the flow of welding current is initiated through the agency of a directional switch which is responsive to the change in direction of travel of the travel carriage occurring between its return stroke and its work stroke.

Figure 1:
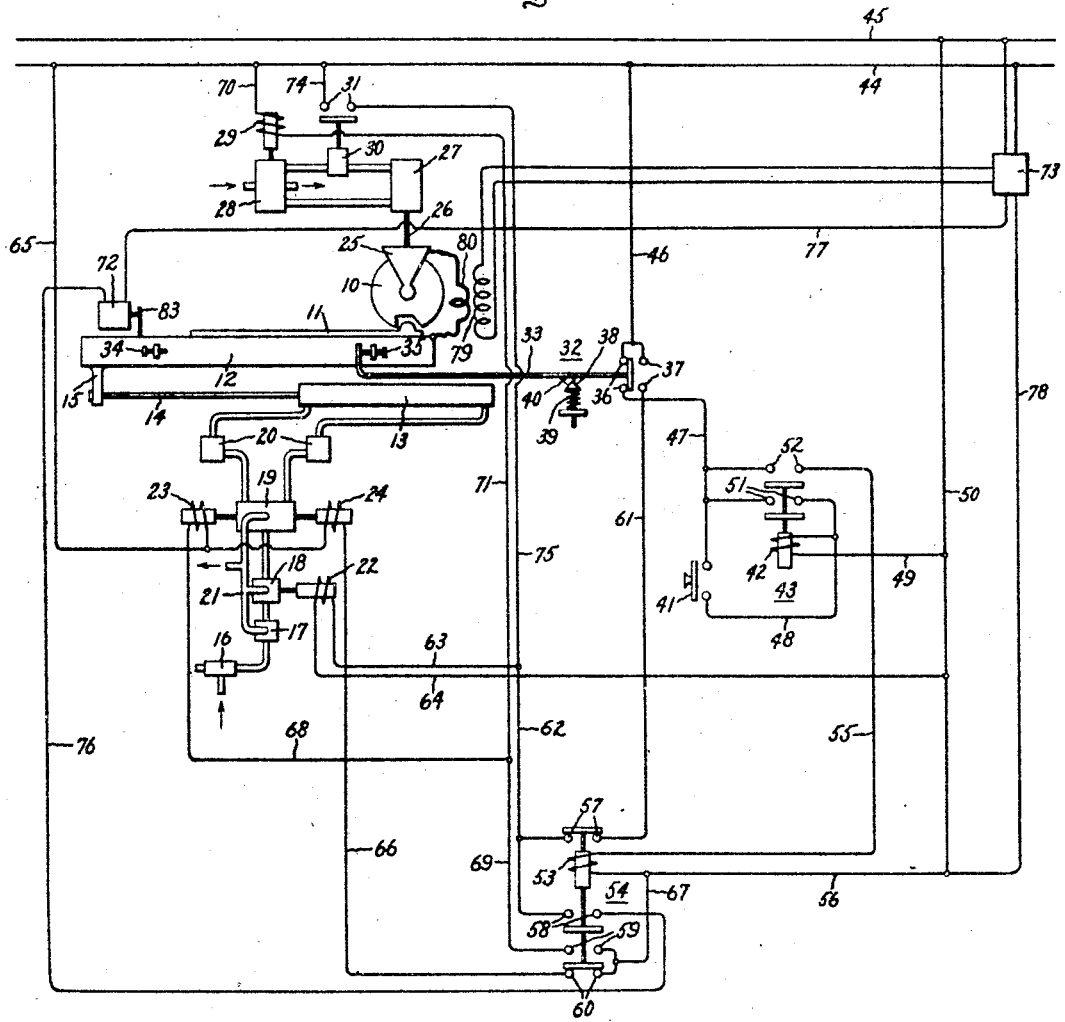
Figure 2:
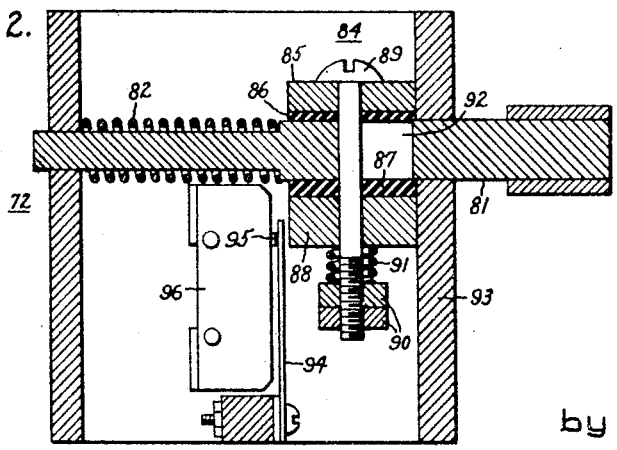

Further objects of my invention will become apparent from a consideration of the welding apparatus illustrated in the attached drawing, Fig. 1 of which diagrammatically illustrates a welding machine and its control, and Fig. 2 of which is a view partly in section of the directional switch forming part of the control illustrated in Fig. 1.

Resistance welding apparatus embodying my invention is particularly useful for fabricating refrigerator evaporators formed of suitably shaped plates provided with depressions that cooperate with one another in forming header and conduit passageways. The plates of such evaporators are joined to one another on opposite sides of the depressions forming the conduit passageways by line welds and it is desirable to have these line welds begin as near as possible to the header. As shown in Fig. 1, these line welds are made by an electrode 10 which travels along the evaporator 11 which is supported in a predetermined position on a travel carriage 12 which is reciprocated relative to the electrode 10. The electrode 10 may be provided as shown in the drawing with a cut away portion which clears the header of the evaporator 11. A plurality of welds may be made at the same time by using a plurality of electrodes 10.

The forward and return movement of travel carriage 11 is controlled by a fluid motor whose cylinder 13 encloses a piston which is connected by a piston rod 14 to an arm 15 forming part of the travel carriage. Oil, or a similar operating fluid, is supplied to the opposite ends of cylinder 13 on opposite sides of its piston by a pump 16 through a pressure control valve 17, a master control valve 18, a direction control valve 19 and speed control valves 20. The operating fluid is discharged from cylinder 13 through valves 20 and 19 through exhaust pipes 21. Pressure control valve 17 and master control valve 18 are also provided with exhaust pipes 21. Master control valve 18 and direction control valve 19 are electrically operated valves and are provided with operating windings 22, 23 and 24. Master control valve 18 is biased to a closed position when its operating winding is deenergized. Each of the speed control valves 20 includes an adjustable throttling valve for controlling the rate of flow of oil to cylinder 13 and a check valve which bypasses this throttling valve and permits the free discharge of oil from cylinder 13 to exhaust pipes 21. By an adjustment of valves 20 the desired rate of forward and return movement of the travel carriage may be set.

Electrode 10 is supported in a yoke 25 which is connected by a rod 26 to a piston located in an air cylinder 27. Admission of air to the opposite ends of this air cylinder on opposite sides of the piston is controlled by an electrically operated air valve 28 which has an operating winding 29. Air valve 28 is normally biased to a position in which air is supplied to cylinder 27 to raise electrode 10 from evaporator 11. When electrode 10 has been forced into engagement with evaporator 11 and exerts a desired welding pressure thereon, a switch 30 which is responsive to air pressure, will close its contacts 31.

The forward and return movement of travel carriage 12 is controlled by a limit switch 32 having an operating member 33 which is located in the path of travel of adjustable stops 34 and 35 attached to the travel carriage. This limit switch is provided with contacts 36 which are closed at the end of the return stroke of travel carriage 12 and with contacts 37 which are closed at the end of the work stroke of this travel carriage. Limit switch 32 has a snap action and its movable contact is held in engagement with contacts 36 or 37 through the agency of a cam 38 which is biased by a spring 39 into engagement with a cooperating cam 40 located on its operating member 33.

A welding operation is initiated by the closing of a switch 41 which connects the operating winding 42 of a relay 43 to the source of alternating current 44, 45 through conductors 46, contacts 36 of limit switch 32, and conductors 47, 48, 49 and 50. This relay is provided with holding contacts 51 which maintain the energization of its operating winding 42 after it has operated and closed these contacts. This relay is also provided with control contacts 52 which control the energization of the operating winding 53 of a relay 54. When relay 43 closes its contacts 52 the operating winding 53 of relay 54 is connected across the source of supply 44, 45 through conductor 46, contacts 36 of limit switch 32, and conductors 47, 55, 56 and 50.

Relay 54 is provided with control contacts 57, 58, 59 and 60. When relay 54 is deenergized, its contacts 57 and 60 are closed and its contacts 58 and 59 are opened and when relay 54 is energized its contacts 57 and 60 are opened and its contacts 58 and 59 are closed. When contacts 57 of relay 54 are closed, an operating circuit for the winding 22 of master control valve 18 is completed from the source of supply 44, 45 through conductor 46, contacts 37 of limit switch 32, conductors 61, 62, 63, 64 and 50. When contacts 60 of relay 54 are closed a control circuit for the operating winding 24 of the direction control valve 19 is completed across the source of supply 44, 45 through conductors 65, 66, 67, 56 and 50. This will cause direction control valve 19 to take a position for admitting operating fluid to the right end of cylinder 13 and for exhausting fluid from the left end of this cylinder so that the fluid motor of which the cylinder 13 forms a part will move travel carriage 12 to the left. When contacts 59 of relay 54 are closed, an operating circuit across the source of supply 44, 45 is completed for the operating winding 23 of direction control valve 19 as well for the operating winding 29 of air valve 28. The operating winding 23 of direction control valve 19 is completed through conductors 65, 68, 69, 67, 56 and 50. The operating winding 29 of air valve 28 is completed through conductors 70, 71, 69, 67, 56 and 50. The closing of contacts 58 of relay 54 in conjunction with the closing of contacts 31 of pressure switch 30 and the closing of the contacts of directional switch 72 connects across the source of supply 44, 45, the control circuit of a switching device 73. This circuit is completed through conductors 74, 75, 76, 77, 78 and 50. Switching device 73 may be an electromagnetic contactor, a thyratron control panel or the like, which controls the connection of the primary 79 of the welding transformer to the source of supply 44, 45. Best results are obtained by using a quick acting switching device. The terminals of the secondary 80 of the welding transformer are respectively connected to electrode 10 and travel carriage 12 of the welding machine.

It will be noted that the operating winding 22 of master control valve 18 is connected across the source of supply 44, 45 upon the closure of contacts 31 of pressure switch 30 through conductors 74, 75, 63, 64 and 50.

The construction of the directional switch 72 of Fig. 1 is illustrated in Fig. 2 of the drawing. This switch is provided with a member 81 biased to a fixed position in a forward direction by a spring 82 and moved from this position an amount varying with variations of the return stroke of travel carriage 12 through the agency of an arm 83 which is mounted on the travel carriage and engages the projecting end of member 81. A second member 84 comprising an assembly of washers 85, 86, 87 and 88 held together by a bolt 89 and nuts 90 through the agency of a spring 91 frictionally engages member 81 and travels therewith through a portion of the travel of this member. The frictional engagement between these members is secured through friction washers 86 and 87 which may be made of fiber. Member 84 has a limited movement relative to member 81 by reason of the slot 92 in member 81 through which the bolt 89 of member 84 extends. Member 84 travels with member 81 in a forward direction until member 84 engages the frame 93 and is then displaced relative to member 81 until the parts assume the position illustrated in Fig. 2. When member 81 travels to the left as viewed in Fig. 2, member 84 travels therewith and engages a lever 94 which moves to the left a predetermined distance determined by the limited travel of the operating member 95 of a switching device 96. Lever 94 may be attached to and supported by frame 93 of the directional switch. When the travel of lever 94 is arrested by the limited movement of operating member 95 of switching device 96, member 84 is then displaced relative to member 81. Frame 93 and the limited movement of operating member 95 of switching device 96 constitute stops limiting the travel of member 84 with member 81.

It is to be noted that the construction of the directional switch is such that on the return movement of travel carriage 12, switching device 96 is operated, that is, opened, irrespective of the variations in return movement of the travel carriage which are compensated by the relative movement of members 81 and 84. As soon as the travel carriage moves in a forward direction, member 84, travelling with member 81 immediately operates switching device 96, that is, allows the switching device 96 to close.

Where very critical adjustments are required, switching device 96 may be of the type shown in United States Letters Patent No. 1,960,020—Philip K. McGall, granted May 22, 1934. This type of switch can be operated by movement of its operating member through a very small range of travel, for example, .001 or .002 of an inch. The criticalness of switching device 96 may also be controlled by the position of its operating member 95 relative to operating lever 94 forming part of the directional switch.

The utility of the welding apparatus diagrammatically illustrated in Fig. 1 of the drawing will best be understood by considering its operation.

The parts of the welding machine and the control therefor are shown in Fig. 1 in the positions they assume at the end of a return stroke following a work stroke during which a line weld has been made in the evaporator 11.

The operator initiates the welding operation by closing start switch 41. This energizes the operating winding 42 of relay 43 by connecting it across the source of supply 44, 45 through conductor 46, contacts 36 of limit switch 32, conductor 47, switch 41, and conductors 48, 49 and 50. Once relay 43 has operated it is held in its closed position through a holding circuit completed through its contacts 51 which are in shunt to switch 41. The operation of relay 43 also completes a circuit through its contacts 52 which energizes the operating winding 53 of relay 54 by connecting it across the source of supply 44, 45 through conductors 46, contacts 36 of limit switch 32, conductor 47, contacts 52 of relay 43, and conductors 55, 56 and 50. The operation of relay 54 completes a circuit through its contacts 58 and 59. The closing of contacts 59 energizes the operating winding 23 of direction control valve 19 and the operating winding 29 of air valve 28. The operating winding 23 of direction control valve 19 is connected across the source of supply 44 and 45 through conductors 65, 68 and 69, contacts 59 of relay 54, and conductors 67, 56 and 50. The operating winding 29 of air valve 28 is connected across the source of supply 44, 45 through conductors 70 and 71, contacts 59 or relay 54, and conductors 67, 56 and 50. The operation of direction control valve 19 as a result of the energization of its operating winding 23 connects the right-hand end of cylinder 13 to exhaust pipes 21 and the left-hand end of this cylinder to the pressure line in series with master valve 18 and pressure control valve 17. The operation of air valve 28 admits air to the upper part of cylinder 27 forcing its piston downward which in turn applies welding electrode 10 to evaporator 11. When the desired pressure has been obtained between electrode 10 and evaporator 11, pressure switch 30 operates closing its contacts 31. The closure of these contacts connects the operating coil 22 of master valve 18 across the source of supply 44, 45 through conductor 74, contacts 31 of pressure switch 30, conductors 75, 63, 64 and 50. Thus, as soon as the desired welding pressure is obtained between welding electrode 10 and evaporator 11, master valve 18 opens admitting operating fluid to the left end of cylinder 13 moving its piston therein and with it travel carriage 12 toward the right.

As soon as travel carriage 12 moves to the right directional switch 72 operates and completes in conjunction with pressure switch 30 whose contacts 31 have already closed, and relay 54, whose contacts 58 have also closed, the operating circuit for switching device 73. This circuit is completed from one terminal 44 of the source of supply through conductor 74, contacts 31 of pressure switch 30, conductor 75, contacts 58 of relay 54, conductor 76, directional switch 72 and conductors 77, 78 and 50. The completion of this control circuit will operate switching device 73 which then connects the primary 79 of the welding transformer to the source of supply 44, 45.

The welding operation proceeds as travel carriage 12 moves to the right during its work stroke until stop 34 on the carriage engages and operates limit switch 32. When this limit switch is operated it opens its contacts 36 and closes its contacts 37. The opening of contacts 36 deenergizes relay 43 which in turn deenergizes relay 54. When relay 54 is deenergized it opens its contacts 58 and 59 and closes its contacts 57 and 60. The opening of its contacts 59 deenergizes the operating winding 23 of directional valve 19 and the operating winding of air valve 28. The ensuing operation of air valve 28 causes the electrode 10 to be raised from the work by the admission of air below its piston and the exhaust of air from above its piston. As a result of the conditions thus established, the pressure switch 30 opens its contacts 31 but this does not deenergize the winding 22 of master valve 18 which has meanwhile been connected by the closing of contacts 37 of limit switch 32 across the source of supply 44, 45 through conductors 46 and 61, contacts 57 of relay 54, and conductors 62, 63, 64 and 50. At about the same time that the operating winding 23 of directional valve 19 has been deenergized by the opening of contacts 59 of relay 54, the operating winding 24 of this valve is connected across the source of supply 44, 45 through contacts 60 of relay 54, this circuit being completed through conductors 65 and 66, contacts 60 of relay 54 and conductors 67, 56 and 50. The operation of direction control valve 19 under the action of its operating winding 24 connects the left end of pressure cylinder 13 to the exhaust pipe 21 and the right end of this cylinder to the pressure supply through master control valve 18 and pressure valve 17. This will cause the piston in cylinder 13 to move to the left and move with it travel carriage 12 until stop 35 on the travel carriage engages and operates limit switch 32 closing its contacts 36 and opening its contacts 37. The opening of contacts 37 deenergizes the winding 22 of master control valve 18 which then closes and arrests the return movement of travel carriage 12. Due to variations in the operations of limit switch 32 and master control valve 18 it is apparent that travel carriage 12 will not uniformly come to rest in the same position after each work stroke.

At the end of the return stroke the several parts of the welding apparatus illustrated in Fig. 1 will assume the positions there illustrated and another welding operation may then be initiated by closing switch 41.

It will thus be seen that by the use of directional switch 72, preferably in combinations with a high speed switching device such as a thyratron control, I obtain the best possible weld location commensurate with variations in the return movement of travel carriage 12. Irrespective of the amount of variation in return movement of the travel carriage as soon as a work stroke is initiated, welding current is supplied to the electrodes and the resulting weld is located as closely as it is possible to locate it in the desired position. In those controls previously employed where a limit switch has been used to control the flow of welding current, it has been necessary to set the limit switch to accommodate the minimum return movement of the travel carriage and in doing this all the welds are spaced from the desired location an amount determined by the minimum return movement of the travel carriage. This I have avoided by the use of a directional switch which accommodates variations in return movement of the travel carriage and which is responsive to changes in the direction of travel of the travel carriage occurring between its return stroke and its work stroke.

My invention is equally applicable to those welding machines in which the electrode is supported by a travel carriage which is traversed over the work. Any form of friction switch of of the type above described which is responsive to changes in direction of travel carriage movement may be substituted for the particular switch illustrated in Fig. 2 of the drawing. By a proper adjustment of the parts of the directional switch, the welding current may be applied after any desired predetermined movement of the travel carriage.

The particular reversing control for the travel carriage above described may be variously modified without departing from my invention which is applicable to any machine in which an electrode is positioned relative to the work by the return movement of a travel carriage which, under the influence of its reversing control, does not uniformly come to the same or a desired position at the end of a return stroke following a work stroke. In the application of my invention above considered, the reversing control functions to return the travel carriage to substantially the same position at the end of each return stroke but reversing controls that function in a manner to secure predetermined variations in return movement of the travel carriage to position the electrode in predetermined desired positions after each work stroke may also be used without departing from my invention.

Furthermore a line welding machine such as above described may be used for performing spot welding operations by suitably interrupting the supply of welding current. In fact, a plurality of overlapping spot welds usually constitute a line weld such as obtained in the above referred to evaporator and by properly controlling the switching device 73, especially if it is a thyratron control, any desired spacing of the spot welds used in making a line weld may be obtained.

In view of the above disclosure of one embodiment of my invention, other embodiments thereof will readily suggest themselves to those skilled in the art and I intend to cover in the appended claims all those variations and modifications of my invention which fall within the true spirit and scope thereof.

What I claim as new and desire to secure by Letters Patent of the United States, is:

1. Resistance welding apparatus wherein an electrode is positioned relative to the work by the return stroke of a travel carriage comprising, a reversing control for said travel carriage which does not uniformly return said travel carriage to the same position at the end of a return stroke following a work stroke, means including a switch for initiating the flow of welding current to said electrode, and means responsive to the change in direction of travel of said travel carriage occurring between its return stroke and its work stroke for operating said switch.

2. Resistance welding apparatus wherein an electrode is positioned relative to the work by the return stroke of a travel carriage comprising, a reversing control for said travel carriage which does not uniformly return said travel carriage to the same position at the end of a return stroke following a work stroke, means including a switch for initiating the flow of welding current to said electrode, and means responsive to the change in direction of travel of said travel carriage occurring between its return stroke and its work stroke for operating said switch, said means including a member operated by said travel carriage through a range of travel varying with variations in the return stroke of said travel carriage, a second member frictionally engaging said first-mentioned member and travelling therewith through a portion of the travel of said first-mentioned member, means for displacing said second-mentioned member relatively to said first-mentioned member before said first-mentioned member reaches the ends of its travel, and means responsive to the movement of said second-mentioned means during its travel with said first-mentioned means for operating said switch.

3. Resistance welding apparatus wherein an electrode is positioned relative to the work by the return stroke of a travel carriage comprising, a reversing control for said travel carriage which does not uniformly return said travel carriage to the same position at the end of a return stroke following a work stroke, means including a switch for initiating the flow of welding current to said electrode, and means responsive to the change in direction of travel of said travel carriage occurring between its return stroke and its work stroke for operating said switch, said means including a member biased to a fixed position in a forward direction and moved by said travel carriage from said fixed position an amount varying with the variations in the return stroke of said travel carriage, a second member frictionally engaging said first-mentioned member and travelling therewith through a portion of the travel of said first-mentioned member, a lever supported at one end and having its free end in the path of travel of said second-mentioned member during the movement of said first-mentioned member in response to the return movement of said travel carriage, a stop engaging said lever and limiting its travel as well as the travel of said second member, a second stop engaging said second member and limiting its travel with said first-mentioned-member during the movement of said first-mentioned member in response to the forward movement of said travel carriage, and means engaging said lever intermediate its ends and responsive to a limited movement of said lever immediately before and immediately after it engages and disengages said first-mentioned stop for operating said switch.

4. In combination, a travel carriage, a reversing control for said travel carriage which does not uniformly return said travel carriage to the same position at the end of a return stroke following a work stroke, a control circuit including a switch, and means responsive to the change in direction of travel of said travel carriage occurring between its return stroke and its work stroke for operating said switch, said means including a frictional drive between driving and driven members, means for limiting the range of travel of said driven member relative to the range of travel of said driving member, and means reversing with the directions of travel of said travel carriage for moving said driving member in reverse directions through a range of travel which is greater than the variations in the return movement of said travel carriage.

5. In combination, a travel carriage having a forward movement and a variable return movement, a member operated by said travel carriage through a range of travel varying with variations in the return movement of said travel carriage, a second member frictionally engaging said first-mentioned member and travelling therewith through a portion of the travel of said first-mentioned member, means for displacing said second-mentioned member relatively to said first-mentioned member before said first-mentioned member reaches the ends of its travel, and means responsive to the change in direction of travel of said travel carriage occurring between its return movement and its forward movement, said means embodying a control circuit including a switch operated by the movement of said second-mentioned member during its travel with said first-mentioned member.

6. In combination, a travel carriage having a forward movement and a variable return movement, a member operated by said travel carriage through a range of travel varying with variations in the return movement of said travel carriage, means responsive to the change in direction of travel of said travel carriage occurring between its return movement and its forward movement, said means embodying a control circuit including a switch having an operating member whose range of movement is limited, a stop spaced from said operating member of said switch an amount less than the travel of said first-mentioned member, and another member frictionally engaging said first-mentioned member and movable therewith between said switch operating member and said stop until displaced relative to said first-mentioned member in its forward and reverse travel by said stop and said operating member of said switch.

FRANCIS M. BECK.